H. S. MacKAY.
ELECTROLYTIC BATTERY.
APPLICATION FILED APR. 9, 1915.
1,182,096.
Patented May 9, 1916.
2 SHEETS—SHEET 1.
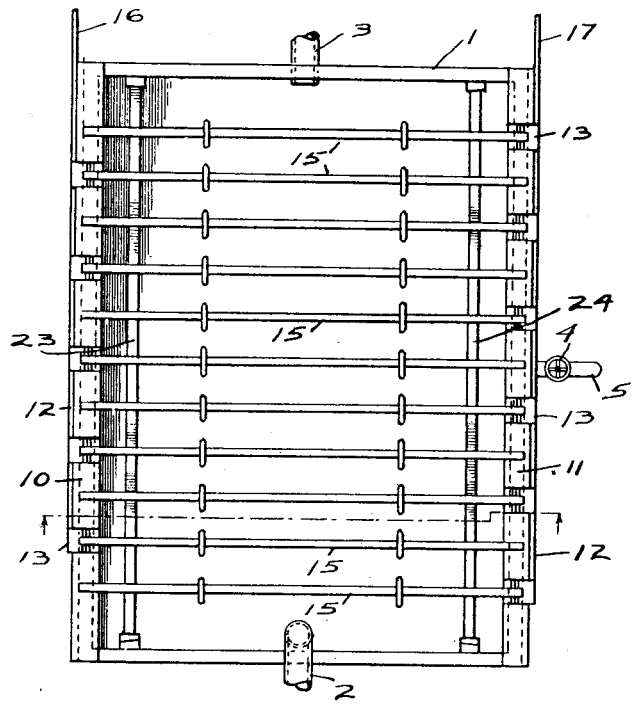
Fig. 1.
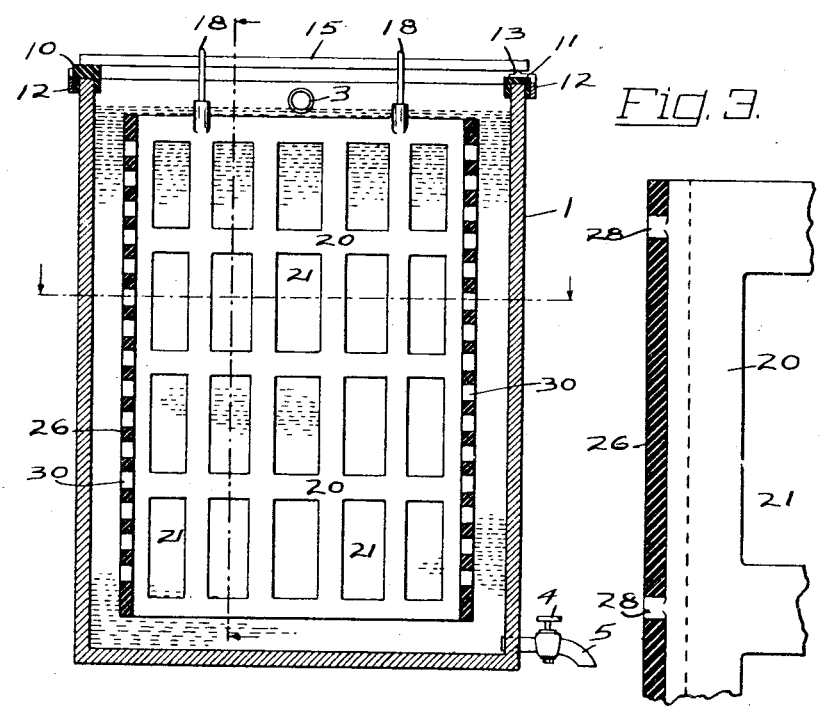
Fig. 2.
Fig. 3.
WITNESSES:-
INVENTOR.
Henry S. MacKay
by
Owen, Owen & Crampton H. S. MacKAY.
ELECTROLYTIC BATTERY.
APPLICATION FILED APR. 9, 1915.
1,182,096.
Patented May 9, 1916.
2 SHEETS—SHEET 2.
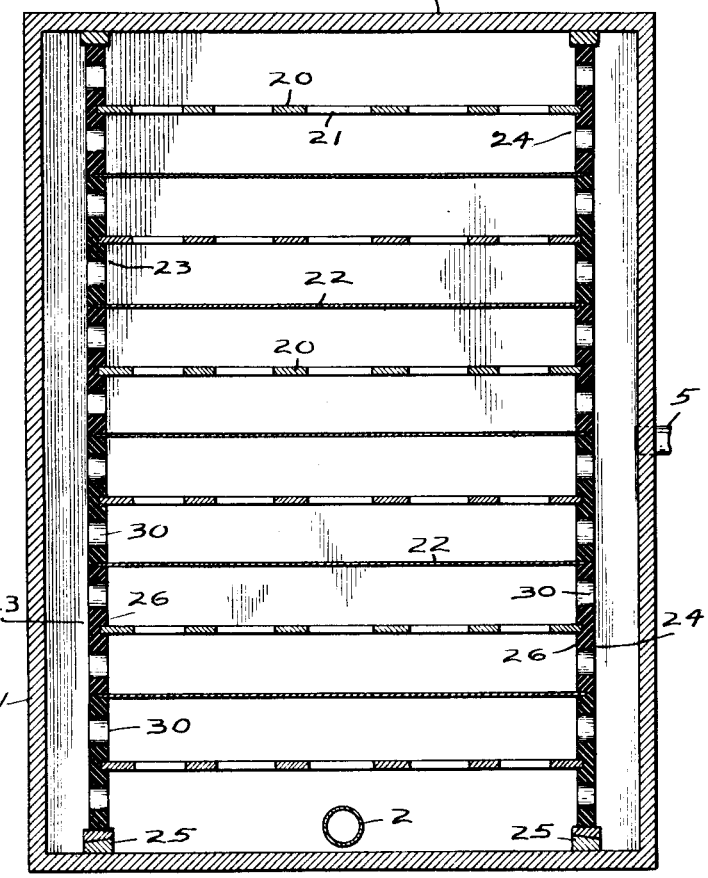
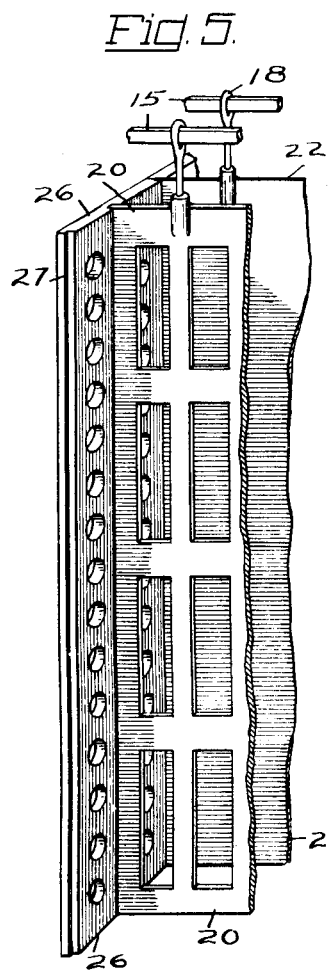
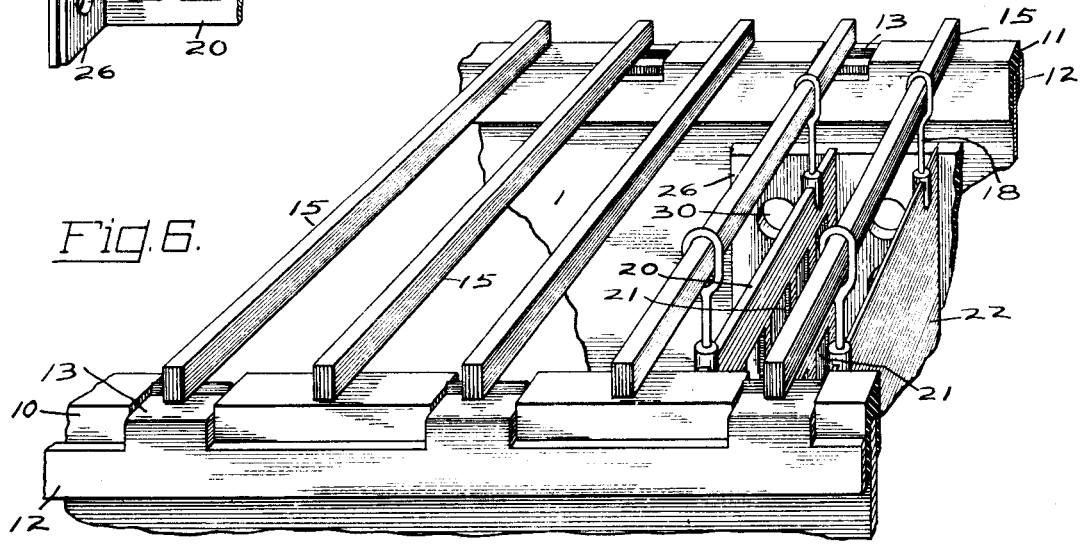
WITNESSES
INVENTOR.
Henry S. MacKay
by
Owen, Owen + Crampton

UNITED STATES PATENT OFFICE.

HENRY S. MacKAY, OF NORWICH, CONNECTICUT, ASSIGNOR TO MacKAY PROCESS COMPANY, OF NORWICH, CONNECTICUT, A CORPORATION OF DELAWARE.

ELECTROLYTIC BATTERY.

1,182,096.  Specification of Letters Patent.  Patented May 9, 1916.

Application filed April 9, 1915. Serial No. 20,331.

*To all whom it may concern:*

Be it known that I, HENRY S. MACKAY, a citizen of the United States, and a resident of Norwich, in the county of New London and State of Connecticut, have invented a certain new and useful Electrolytic Battery; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to electrolytic batteries and it is particularly adapted to the precipitation of metal from solutions.

The invention particularly relates to the arrangement and construction of the electrodes of the battery or precipitating cells.

A means is provided whereby there is a perfect circulation of the electrolyte through and between the electrodes of the battery and also a means for holding the electrodes in exact parallel relation. By the first means a liquid having a uniform concentration of the salt of the metal is constantly maintained by circulation of the metal solution so that the metal is brought into the electrolytic battery as fast as it is deposited whereby there will be between all the parts of the plates of the battery a uniform current density and a uniform precipitation of the metal, and a uniform electrolyte. The placing of the plates in exact parallel relation permits the plates to be placed exceedingly close together, greatly reducing thereby the resistance of the electrolyte and correspondingly increasing the amount of the metal that will be precipitated per unit of electric energy on any given plate.

The invention may be contained in many forms of batteries usable for different purposes all of which come within the purview of my claims hereinafter appended. To show the practicability of my invention I have selected a construction as an example and shall describe it hereinafter. The battery selected is illustrated in the drawings.

Figure 1 of the drawings illustrates a top view of the battery. Fig. 2 illustrates a vertical section of the battery, while Fig. 3 illustrates a broken view of one of the anode plates. Fig. 4 is a transverse horizontal view of the battery of plates. Fig. 5 is a perspective broken view of two of the plates and Fig. 6 illustrates a broken view of the parts of the battery showing the supporting rods and the manner of supporting the plates on the conductor rods.

1, in the figures, is a vat which contains the plates and the solution which is subjected to the electrolytic process. An inlet pipe 2 extends into the vat 1 and may extend to the bottom of the vat. An overflow 3 is located near the top edge of the side of the vat 1 opposite to the end in which the inlet pipe 2 is located. A valve 4 is located in a pipe or faucet 5 for the purpose of drawing off the solution from the vat 1. The vat 1 may be provided with insulating strips 10 and 11 along the upper edges 2 of the opposite sides. Conductors 12 may be secured to the upper edges of two opposite sides of the vat 1 or may be secured to the insulating strips 10 and 11. The conductors 12 have inwardly extending lips 13 which extend over the insulating strips 11 and into transverse channels cut therein. The lips are located in spaced relation along the strips 10 and 11 and the lips of the conductor 12 on one side of the vat 1 are opposite to the spaces between the lips of the conductor 12 on the opposite side of the vat 1. Supporting conductor bars 15 extend across the top of the vat. The ends of the conductor supporting bars 15 on each side of the vat rest alternately upon the lips 13 of the conductors 12 and the insulating strips 11 so that the conductors 15 are connected or in contact with the conductors 12 alternately. A source of current supply may be connected to the ends 16 and 17 of the conductors 12. One set of plates of the battery are connected to the terminal 16 and the other set of plates of the battery are connected to the terminal 17.

The plates may be connected to the conductors 15 by any suitable means, such as, by the eyes or hooks 18 which are placed over the conductors 15. The anode plates 20 of the battery are provided with large openings 21 which greatly reduces the area of the plates. This area may be reduced to as much as fifty per cent. by the openings which are formed in the plates 20. The large openings permit free circulation of the liquid through the battery and enable the liquid to pass through and around the anode plates and between the cathode plates 22.

The plates of the battery are securely held in position along their vertical side edges by walls 23 and 24 of insulating material. The walls 23 and 24 are preferably channeled in order to receive the plates and hold them in exact parallel relation with respect to each other. The walls are preferably made of parallel strips 26 which are secured to the anode plates and which are tightly compressed edgewise together so as to form a continuous wall when the plates are in position, holding the cathodes between the edges of the strips secured to the anode plates and held together by wedges 25 or bodies having inclined surfaces. In the form shown the strips are secured to the side edges of the anodes 20 by means of the studs 28 which are formed integral with the anode plates 20. The studs 28 extend through the insulating strips 26 so as to securely fasten the two at right angles to each other. The strips 26 may be provided with rabbeted edges 27 for receiving the cathodes 22 and so that when the strips 25 are forced together they will clamp and inclose the edges of the cathodes 22 and hold the cathodes and anodes in parallel relation. The strips 26 are also provided with a plurality of openings 30 on each side of the anodes 20. This also permits a free circulation of the electrolyte through the vat and between the anode and cathode plates.

In the drawing the distance between the plates is shown out of proportion to the plates for the purpose of clearness of illustration. The plates are placed exceedingly close together which may be done by reason of the parallel relation of the plates.

Having thus described my invention, what I claim as new and desire to secure by Letters Patent, is,—

1. In an electrolytic precipitation battery, the combination of a plurality of anode plates, insulating strips secured to the side edges of the anode plates, cathode plates located between the edges of the strips, and means for clamping the strips together along the side edges of the strips.

2. In an electrolytic precipitation battery, the combination of a plurality of anode plates, insulating strips secured to the side edges of the anode plates, cathode plates located between the edges of the strips, and means for clamping the strips together along the side edges of the strips, the strips and the anode plates having openings for permitting the circulation of a fluid through the battery.

3. In an electrolytic precipitation battery, the combination of a plurality of anode plates having openings of size to reduce the surface area to substantially fifty per cent., insulating strips secured to the vertical side edges of the anode plates and having rabbeted edges and openings, cathode plates located between the edges and in the rabbeted corners of the insulating strips, and means for locking the strips together and clamping the cathode plates.

4. In an electrolytic precipitation battery, the combination of a plurality of anodes and cathodes, insulating spacing walls for spacing the anodes and cathodes, the walls having rows of openings between consecutive plates and the anode plates having openings covering an area substantially equal to fifty per cent. of the total area of the anode plates for permitting the circulation of the electrolyte.

In testimony whereof, I have hereunto signed my name to this specification in the presence of two subscribing witnesses.

HENRY S. MacKAY.

Witnesses:
C. A. HOLDER,
H. D. JAMESON.